3,349,127
METHOD OF TETRACYCLINE ISOLATION
FROM FERMENTED MEDIA
Karel Čulík, Jaroslav Dašek, and Josef Palkoska, Prague,
and Jiří Pelzbauer, Roztoky u Prahy, Czechoslovakia,
assignors to Spofa, sdruzeni podniku pro zdravolnickou
vyrobu, Prague, Czechoslovakia
No Drawing. Continuation of application Ser. No.
359,509, Apr. 13, 1964. This application June 22,
1966, Ser. No. 559,690
Claims priority, application Czechoslovakia,
Apr. 16, 1963, 2,205/63
7 Claims. (Cl. 260—559)

The present application is a continuation of our copending application Ser. No. 359,509, filed Apr. 13, 1964, entitled "Method of Tetracycline Isolation from Fermented Media," and now abandoned.

The subject of the invention is the preparation of the antibiotic tetracycline in pharmacopoeically pure form from media resulting for cultivation of the productive microorganisms.

In the onset years tetracycline was produced exclusively by catalytic dehalogenation of chlorotetracycline. Later, in connection with the discovery of the more advantageous method of direct fermentative preparation of tetracycline, a number of isolation methods of this antibiotic from fermented media were described in the world's literature. The question is mostly of methods originally developed for isolation of the two prior known antibiotics, chlorotetracycline, and especially oxytetracycline that on account of their chemical similarity with tetracycline were applied to the preparation of the latter. Mostly extractive methods are described, e.g. direct extraction from fermented media including the mycellium, according to the U.S. Patent No. 2,875,247, or extraction into butanol.

While adsorption methods operating with ion-exchange resins did not find a wider application in respect of tetracycline, there are relatively frequently mentioned methods, wherein the active substance is precipitated from the filtrate of the fermented medium in the form of insoluble complexes. There come into consideration tetracycline complexes with alkaline earth metals, complexes with quaternary ammonium bases, or complexes with dyes or anionic wetting agents. In the patent literature also combinations of the precipitation and extraction methods are described, e.g. precipitation of the mixed complex of tetracycline with magnesium, calcium and a quaternary pyridine base, and subsequent dissolving this mixed complex in a mixture of alcohols and butyl acetate.

As already mentioned, the above described methods are based on the certain chemical similarity of all three principal antibiotics, and therefore are more or less applicable to isolation of any of the antibiotics with a reasonable yield and at economically tolerable cost.

Now we have newly found that it is preferable to utilize some specific properties of tetracycline itself to a simple method of its isolation from the filtrate of fermented media. This potential utilization is given by the great progress in the biosynthesis of tetracycline, whereat the technical progress is advancing more rapidly than in the region of chemical isolation. While some years ago, with the application of the first known isolation methods, there has been started from fermented media containing less than 1 g. active substance in 1 litre, nowadays fermented media with a tenfold concentration of the active substance are quite current. We found that at higher tetracycline concentrations in the filtrate of fermented media it is highly economical to utilize the relatively low solubility and good crystallization ability of the amphoteric form of tetracycline to its isolation in pure form.

The solubility of tetracycline is amphoteric form in water is lower than 0.1%, and its solubility, in the presence of other soluble components, in the filtrate of fermented media amounts to 0.1–0.15% at normal temperature. During fermentation tetracycline is contained in the medium by the major part as a precipitate of its low-soluble calcium salt. From the form of the calcium salt it became liberated during the processing of fermented media by acidification, and passes over in solution, mostly as oxalate, sulfate or hydrochloride, according to the acid used for acidification. The solubility of tetracycline salts with strong acids is very high, theorectically up to 10%. The filtrate of the acidified fermented medium after filtering off the mycelium constitutes nowadays usually an about 0.5–1% tetracycline solution in the form of its readily soluble salt with the acid, preferably within the pH range of about 1.5 to 2.0. During the gradual neutralization of the acid solution with alkalis tetracycline is getting into the pH range of its isoelectric point, i.e. pH 5–6, and turns to the form of supersaturated solution of the amphoter, in which moment its theoretical solubility is up to 10 times lower than the concentration in the supersaturated solution. Even if the actual solubility in the medium of accompanying ballasting substances is somewhat higher, a favourable potentiality is given of isolating tetracycline from the fermented media. In addition there is a good crystallizability of the amphoteric form, giving with water well defined crystalline hydrates. The crystallization is enhanced by temperature decrease to below 10° C. We found that at the just cited conditions practically pure tetracycline is eliminated, especially if prior to the adjustment of medium there is possible to eliminate the ballasting substances that eventually could have been present in the filtrate of the fermented medium, owing to the not always uniform course of fermentation, and might be eliminated from the solution at a pH near the crystallization conditions of tetracycline. So far as said substances occur, they are of proteinaceous character, and it proved advantageous to eliminate them in advance by coagulation within the pH range of about 3.4. Likewise the pre-adjustment of the medium by means of wetting agents of the dibutylnaphthalene sulfinate type was verified, achieving precipitation of ballasting substances within the acid range.

For media with a lower tetracycline content, resulting from less successful fermentations, partial concentration of the effective substance was tested, effected by concentrating the filtrate of the fermented medium to about twofold concentration, and followed by the isolation procedure described. In this procedure the fact proved advantageous, that under the abovedefined conditions tetracycline crystallizes in a purity meeting the demands of the pharmacopoeia, and owing to the specificity of the elimination method it is not even contaminated with chlorotetracycline, which in a slight percentage or traces is usually present in the fermented medium.

As already mentioned, the solubility of the amphoteric tetracycline form in the filtrate of fermented medium is higher than would correspond to the solubility in pure water under equal conditions. After crystallization of tetracycline there always remain in solution about 20–30% of the initial tetracycline content. With our procedure method this portion is valorized in the manner that it is transferred in concentrated form to the subsequent fermentation batch, thus enriching the concentration of the effective substance in the filtrate of the next fermented medium, and increasing the yield of the next crystallization operation. The mother liquors, i.e. the filtrate of fermented media after crystallization of tetracycline at pH 4.0–6.0 is neutralized forth with alkalis up to pH 8.0–8.5, and the eliminated magnesium complex of tetracycline is caught on the filter serving for filtration of the next batch of the acid fermented medium or filtrate thereof. The magnesium complex is dissolved by action of the excess acidity, and the tetracycline passes over into solution.

For illustration of the method according to the invention may serve the following examples, without any limitation to them.

*Examples*

(1) 1.000 ml. of the fermented medium filtrate, acidified with 1% of oxalic acid and containing 6.800 gamma tetracycline/ml., was adjusted by addition of 0.2% sodium dibutylnaphthalene sulfonate and 0.5% of activated charcoal. After filtration the pH of the solution was increased to 3.8 by ammonia water, and the solution inoculated with crystals of the tetracycline base. After the crystallization was started, as manifested by beginning elimination of crystals on the glass beaker walls, the pH was gradually adjusted during 4 hours to the final value of 5.1. At the same time the solution was cooled down to the temperature of 7° C. The crystallization was completed by 3 hours' standing at the said temperature. The crystals eliminated were sucked off, washed with water and acetone, and dried. The bright-yellow product weighed 4.85 g., showed biological activity 955 $\mu$/mg., moisture 15.5% pH of the saturated solution 5.25, extinction 351. The product was conforming with the requirements of U.S.P. XV in all the criteria. The mother liquors after crystallization, water and acetone washings not include, contained 1550 $\mu$/ml. They were alkalized with ammonia to pH 8.3, and filtered with addition of kieselguhr. The filtration cake was added to the mixture of the Example 2. The residual activity in the waste medium was determined as 210 $\mu$/ml.

(2) 1.000 ml. of the fermented medium filtrate acidified with 1% of oxalic acid to pH 2.0 and containing 3,400$\mu$ tetracycline/ml., was adjusted with ammonia to pH 3.4 and concentrated in vacuo at a temperature of 34° C. to a volume of 705 ml. To the concentrated filtrate the filtration cake from Example 1 with regenerated active substance was added and the pH readjusted to the value of 3.4. Thereupon 0.02% activated charcoal was added and the mixture filtered. After filtration the volume was 710 ml., and activity 6050 $\mu$/ml. The temperature of the solution was brought down from 32° to 6° C., the pH adjusted with ammonia to 3.8 and the solution inoculated with tetracycline crystals. The further procedure was analogous to Example 1. The isolated tetracycline weighed 3.02 g., and showed activity of 947 $\mu$/mg. For preparation of the hydrochloride tetracycline was dissolved in 10 ml. ethanol under addition of concentrated hydrochloric acid up to an excess of 1.2 equivalent. By warming the solution to 42° C. the crystallization of the hydrochloride was accelerated. The product filtered off and dried weighed 2.12 g., showed activity of 960 $\mu$/mg.

We claim:
1. A method of recovering tetracycline from a fermented medium including impurities adapted to be precipitated by addition of sodium dibutylnphthalene sulfonate and containing said tetracycline in the form of a solid dispersion of a salt thereof adapted to be dissolved at a pH of 2 or below and in a concentration higher than the concentration at which amphoteric tetracycline is soluble in an aqueous medium at a pH of between about 3 and 6, comprising the steps of acidifying said fermented medium to a pH of between about 1.5 and 2 so as to dissolve said tetracycline; admixing to the thus acidified fermented medium an effective amount of sodium dibutylnaphthalene sulfonate so as to precipitate said impurities; removing the thus precipitated impurities; raising the pH of the thus formed tetracycline-containing solution to between 3 and 6 so as to obtain said tetracycline in its amphoteric form and to precipitate the major portion thereof in the form of crystals; and recovering the thus formed crystals of amphoteric tetracycline.

2. A method of recovering tetracycline from a fermented medium containing the same, as defined in claim 1, wherein acidification of said fermented medium is carried out with an acid selected from the group consisting of hydrochloric, oxalic, and sulfuric acid.

3. A method of recovering tetracycline from a fermented medium containing the same, as defined in claim 2, wherein said acid is oxalic acid.

4. A method of recovering tetracycline from a fermented medium containing the same, as defined in claim 1, where the pH of said tetracycline-containing solution is raised to up to and during said raising of the pH of the tetracycline-containing solution the latter is cooled to below 10° C.

5. A method of recovering tetracycline from a fermented medium containing the same, as defined in claim 1, wherein the pH of said tetracycline-containing solution is raised to about the isoelectric point of said amphoteric tetracycline.

6. A method of recovering tetracycline from a fermented medium containing the same, as defined in claim 1, wherein said fermented medium contains proteinaceous impurities adapted to coagulate at a pH of about 3.4, and wherein, prior to the addition of said sodium dibutylnaphthalene sulfonate, the pH of said acidified fermented medium is first raised to about 3.4 so as to coagulate said impurities and the thus coagulated impurities are removed, and wherein after removal of precipitate with sodium dibutylnaphthalene sulfonate the pH of said acidified fermented medium is further raised to a value not exceeding 6.

7. A method of recovering tetracycline from a fermented medium containing the same, as defined in claim 1, wherein the residual portion of the fermented medium remaining after recovery of crystals of amphoteric tetracycline still contains highly diluted dissolved tetracycline, and including the steps of concentrating said residual portion of the fermented medium so as to increase the concentration of the dissolved tetracycline therein to above 0.3%; and thereafter recovering tetracycline from the thus concentrated residual portion of the fermented medium.

References Cited

UNITED STATES PATENTS

| | | | |
|---|---|---|---|
| 2,734,018 | 2/1956 | Minieri et al. | 260—559 |
| 2,744,931 | 5/1956 | Broschard et al. | 260—559 |
| 2,847,471 | 8/1958 | Vandeputte et al. | 260—559 |
| 2,886,595 | 5/1959 | Heinemann et al. | 260—559 |
| 2,929,837 | 3/1960 | Ogawa et al. | 260—559 |

NICHOLAS S. RIZZO, *Primary Examiner.*